(12) United States Patent
Choo

(10) Patent No.: US 8,228,816 B2
(45) Date of Patent: Jul. 24, 2012

(54) DEVICE AND METHOD FOR LINK BALANCING DETECTION

(75) Inventor: Dong-Soo Choo, Gwangju (KR)

(73) Assignee: KT Corporation, Gyeonggi-do (KR)

( * ) Notice: Subject to any disclaimer, the term of this patent is extended or adjusted under 35 U.S.C. 154(b) by 336 days.

(21) Appl. No.: 12/710,305

(22) Filed: Feb. 22, 2010

(65) Prior Publication Data

US 2010/0150017 A1 Jun. 17, 2010

Related U.S. Application Data

(63) Continuation of application No. PCT/KR2008/004813, filed on Aug. 19, 2008.

(30) Foreign Application Priority Data

Aug. 23, 2007 (KR) .................. 10-2007-0085161

(51) Int. Cl.
*H04L 1/00* (2006.01)
(52) U.S. Cl. ................... 370/252; 455/69; 455/522
(58) Field of Classification Search ........... 370/252; 455/69, 522
See application file for complete search history.

(56) References Cited

U.S. PATENT DOCUMENTS

| | | | |
|---|---|---|---|
| 2004/0266447 A1* | 12/2004 | Terry | 455/450 |
| 2005/0143118 A1 | 6/2005 | Bernhardsson et al. | |
| 2008/0182511 A1* | 7/2008 | Adkins et al. | 455/9 |
| 2009/0042593 A1* | 2/2009 | Yavuz et al. | 455/522 |
| 2009/0170548 A1* | 7/2009 | Soliman | 455/522 |

OTHER PUBLICATIONS

Jussi Aijanen et al., "Frame Configuration Impact to the Performance of UTRA TDD System", 14th IEEE 2003 International Symposium on Personal, Indoor and Mobile Radio Communication Proceedings, pp. 906-910, Sep. 7-10, 2003.
International Search Report for International application No. PCT/KR2008/004813 dated Feb. 26, 2009 by Korean Intellectual Property Office.

* cited by examiner

*Primary Examiner* — Luat Phung
(74) *Attorney, Agent, or Firm* — IP Legal Services, LLC

(57) ABSTRACT

A method of detecting a link balance of coverage of a down link and an up link in a WCDMA system is disclosed. The method includes setting a minimum receiving signal code power (RSCP) by using system information received from a base station, setting a maximum terminal Tx power for transmitting radio waves to the base station from a communication terminal according to the minimum RSCP, setting a reference value of a link balance detection quotient for detecting whether the up link and down link coverage has a defect by calculating the minimum RSCP and the maximum terminal Tx power, measuring a RSCP and a terminal Tx power from the communication terminal, and detecting the balance of the down link and up link coverage by comparing the reference value of the link balance detection quotient with a value calculated according to the measured RSCP and terminal Tx power.

6 Claims, 3 Drawing Sheets

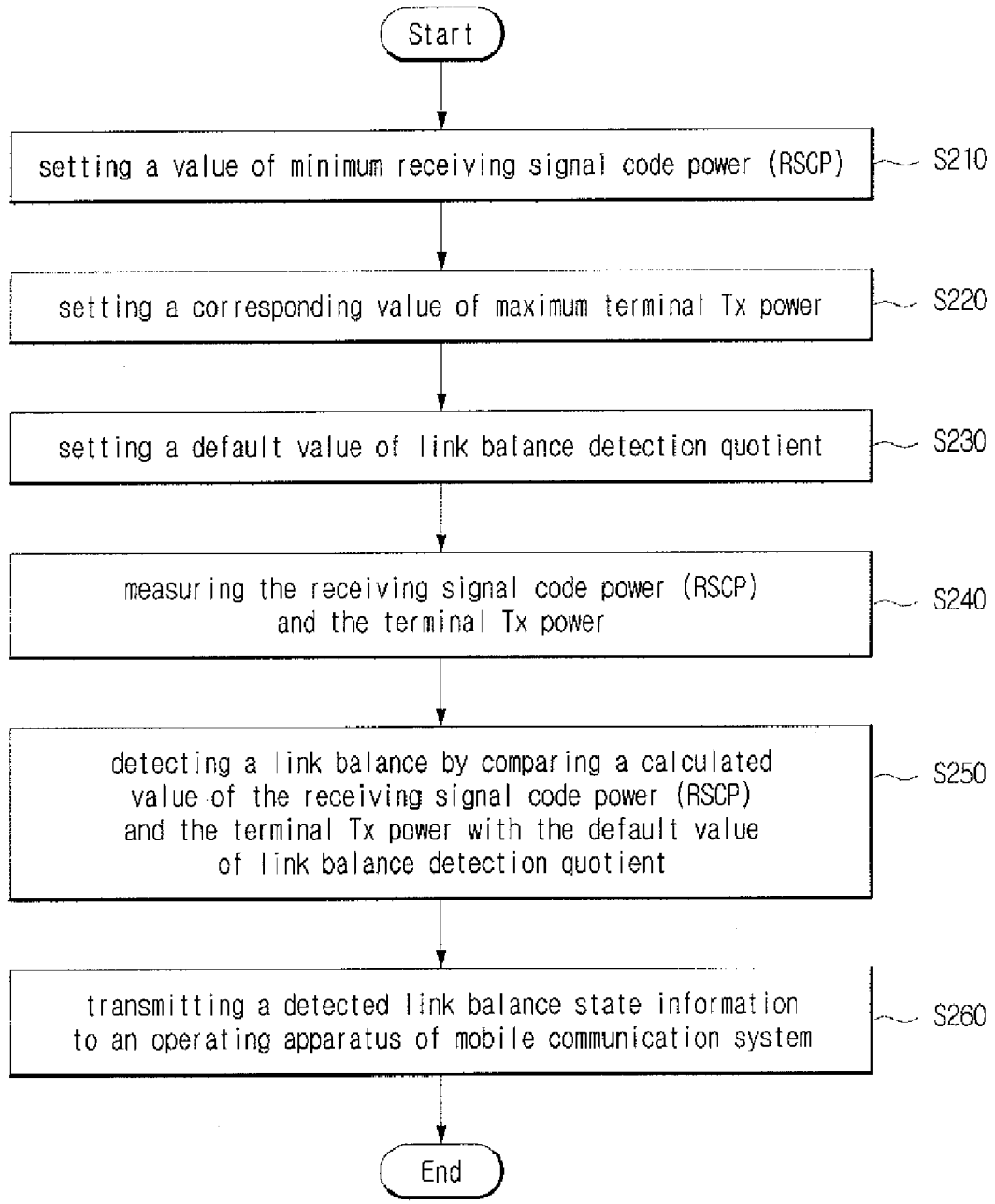

FIG. 3

| | Link balance detection quotient | Check point | Note (when detecting a defect location) |
|---|---|---|---|
| Base station | + | need the checking of up link degradation | more than +10 dBm |
| | − | need the checking of down link degradation | less than −10 dBm |
| Repeater | + | need the checking of repeater's up link degradation<br>need the checking of repeater's down link oversetting | more than +10 dBm |
| | − | need the checking of repeater's down link degradation<br>need the checking of repeater's up link oversetting | less than −10 dBm |

DEVICE AND METHOD FOR LINK BALANCING DETECTION

CROSS-REFERENCE TO RELATED APPLICATIONS

This application is a continuation application, and claims the benefit under 35 U.S.C. §§120 and 365 of PCT Application No. PCT/KR2008/004813, filed on Aug. 19, 2008, which is hereby incorporated by reference. PCT/KR2008/004813 also claimed priority from Korean Patent Application No. 10-2007-0085161, filed on Aug. 23, 2007, which is hereby incorporated by reference.

BACKGROUND OF THE INVENTION

1. Field of the Invention

The present invention relates to a link balance detecting device and a method of detecting a link balance, more specifically to detect a balance of coverage of a downlink (DL) and an uplink (UP) in a cell that provides mobile communications services.

2. Description of the Related Technology

A distance and a radio wave transmission path between a base station and each communication terminal can be varied respectively. Accordingly, a signal from a far communication terminal to a base station can be in a weak electric field. For that reason, the signal from the far communication terminal to the base station can be interrupted by a signal in a strong electric field from a near communication terminal to the base station. This refers to as the Near/Far problem.

SUMMARY OF CERTAIN INVENTIVE ASPECTS

One aspect of the present invention is a link balance detecting device and a method of detecting a link balance of coverage of a downlink and an uplink, more specifically to detect whether the uplink and downlink coverage has a defect or not in a cell that provides mobile communications services in a mobile communications system.

Another aspect is a link balance detecting device and a method of detecting a link balance, in which while checking whether the uplink and downlink coverage of a cell has a defect, the checking of path loss and degradation of a base station or a repeater's subscriber terminal can be performed so that trouble-shooting and the operating of operating device is simple.

Another aspect is a method of detecting a link balance is disclosed. The method of detecting a link balance of coverage of a down link and an up link in a mobile communications system, the method performed by a link balance detecting device can include (a) setting a minimum receiving signal code power (RSCP) by using system information received from a base station, (b) setting a maximum terminal Tx power for transmitting radio waves to the base station from a communication terminal in accordance with the minimum receiving signal code power (RSCP), (c) setting a reference value of a link balance detection quotient for detecting whether the up link and down link coverage has a defect by calculating the minimum receiving signal code power (RSCP) and the maximum terminal Tx power, (d) measuring a receiving signal code power (RSCP) and a terminal Tx power from the communication terminal, and (e) detecting the balance of the down link and up link coverage by comparing the reference value of the link balance detection quotient with a value calculated in accordance with the measured receiving signal code power (RSCP) and terminal Tx power.

Another aspect is a device for detecting a link balance. The device for detecting a balance of a down link and up link coverage in a mobile communications system can include: a link balance detection quotient reference value setting part configured to set a reference value of a link balance detection quotient for detecting whether the up link and down link coverage has a defect by using a minimum receiving signal code power (RSCP) and a maximum terminal Tx power of a communication terminal by using system information received from a base station, wherein the maximum terminal Tx power is terminal Tx power, in which radio waves are transmitted from the communication terminal to the base station, in accordance with the minimum receiving signal code power (RSCP); a parameter calculating part configured to measure a receiving signal code power (RSCP) and a terminal Tx power measured at the communication terminal; and a link balance detecting part configured to detect the balance of the down link and up link coverage from a cell to which the communication terminal belongs, by comparing the reference value of the link balance detection quotient with a calculated value of the receiving signal code power (RSCP) and the terminal Tx power.

Another aspect is a method of detecting a link balance of coverage of a down link and an up link in a mobile communications system, the method comprising: setting a minimum receiving signal code power based on system information received from a base station; setting a maximum terminal Tx power for transmitting radio wave to the base station from a communication terminal in accordance with the minimum receiving signal code power; setting a reference value of a link balance detection quotient for detecting whether the up link and down link coverage has a defect based on calculation of the minimum receiving signal code power and the maximum terminal Tx power; measuring a receiving signal code power and a terminal Tx power of the communication terminal; and detecting the balance of the down link and up link coverage based on comparison of the reference value of the link balance detection quotient with a value calculated in accordance with the measured receiving signal code power and terminal Tx power.

Another aspect is a device for detecting a balance of a down link and up link coverage in a mobile communications system, the device comprising: a reference value setting portion configured to set a reference value of a link balance detection quotient for detecting whether the up link and down link coverage has a defect based on a minimum receiving signal code power and a maximum terminal Tx power of a communication terminal with the use of system information received from a base station, wherein the maximum terminal Tx power is a terminal Tx power, in which radio wave is transmitted from the communication terminal to the base station, in accordance with the minimum receiving signal code power; a parameter calculator configured to calculator a receiving signal code power and a terminal Tx power associated with the communication terminal; and a link balance detector configured to detect the balance of the down link and up link coverage from a cell to which the communication terminal belongs, based on comparison of the reference value of the link balance detection quotient with a calculated value of the receiving signal code power and the terminal Tx power.

Another aspect is a device for detecting a link balance of coverage of a down link and an up link in a mobile communications system, the device comprising: means for setting a minimum receiving signal code power based on system information received from a base station; means for setting a maximum terminal Tx power for transmitting radio wave to the base station from a communication terminal in accordance with the minimum receiving signal code power; means for setting a reference value of a link balance detection quotient for detecting whether the up link and down link coverage has a defect based on calculation of the minimum receiving signal code power and the maximum terminal Tx power; means for measuring a receiving signal code power and a terminal Tx power of the communication terminal; and means for detecting the balance of the down link and up link coverage based on comparison of the reference value of the link balance detection quotient with a value calculated in accordance with the measured receiving signal code power and terminal Tx power.

BRIEF DESCRIPTION OF THE DRAWINGS

FIG. 2 shows a method of detecting a link balance in accordance with an embodiment of the present invention.

FIG. 3 shows a link balance detection quotient and explains the state of network by using system information messages in accordance with an embodiment of the present invention.

DETAILED DESCRIPTION OF CERTAIN INVENTIVE EMBODIMENTS

Figure 1:
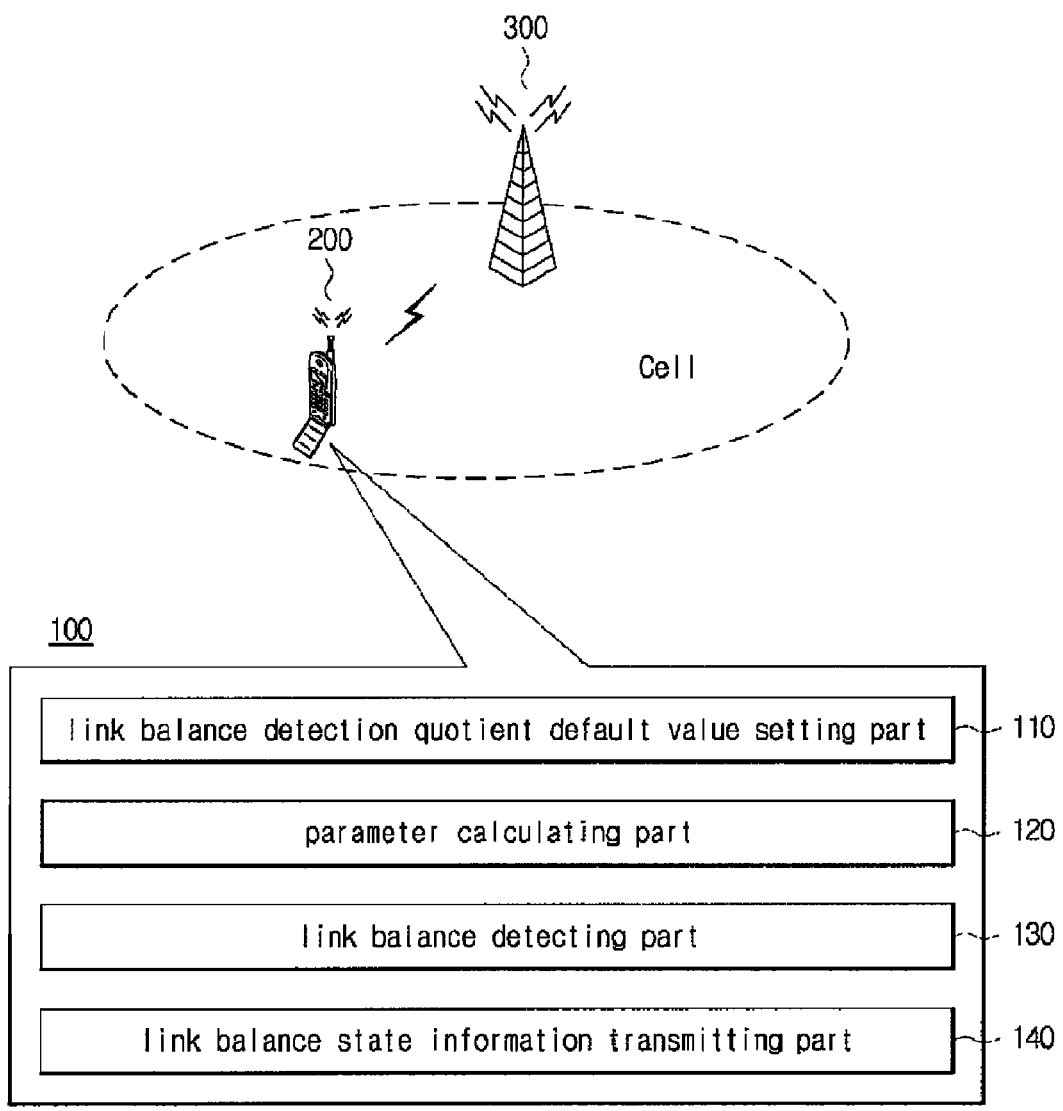
FIG. 1 shows a link balance detecting device in accordance with an embodiment of the present invention.

The Near/Far problem can be solved by maintaining the electric field of signals received from each communication terminal to the base station on a level. So, the maximum channel capacity can be obtained in a state of maintaining the electric field of signals received from each communication terminal on a level. In order to obtain the maximum channel capacity, the communication terminal has to change its Tx-power while moving from place to place.

A Tx-power control can be referred to as a method for improving the performance of system by minimizing radio wave interference in mobile wireless channel surroundings. The Tx-power control can be classified into two groups that are an open loop power control and a closed loop power control. The open loop power control refers to as a procedure that is to fluctuate the output of the communication terminal being in inverse proportion to a distance between the base station and each communication terminal for minimizing the initial Tx-power of the communication terminal.

In detail, the communication terminal measures a received down power. Then, the communication terminal determines an up Tx-power based on the received down power. Thus, the communication terminal can control the Tx-power hereinafter by the closed loop power control.

The closed loop power control refers to as a procedure that is to maximize the up telephonic communication capacity by minimizing the output of communication terminal while on the line. In detail, the communication terminal reports a received Eb/No value to the base station. Afterwards, the base station gives a power control fluctuation order at intervals of each time by comparing the received Eb/No value with a default value. The communication terminal corrects errors of the open loop power control by controlling its Tx-power in accordance with power control orders from the base station. Through the methods above, the base station can satisfy the proper quality of telephonic communication and the maximum capacity by controlling the up channel power of all the communication terminals.

The code division multi-access (CDMA) system has a value called Tx-Adjust. The Tx-Adjust is a value used by an operator for detecting the balance of a link. The Tx-Adjust shows a relative state of a downlink to an uplink of the appropriate cell. Consequently, the operator can predict the quality state of coverage of the appropriate cell through the Tx-Adjust. For example, assume that the gain of the downlink is 100, and the gain of the uplink is 95. In this case, the Tx-Adjust can be recorded as +5. Therefore, the defective proportion of telephonic communication can be predicted as 5% by the shortage of uplink gain.

Generally, satisfactory cell coverage can be referred to as the uplink coverage that is bigger than the downlink coverage. Because the defective proportion of telephonic communication must be lower in the mobile communications services provided from the appropriate cell. For that reason, the Tx-Adjust can be maintained to have a negative value. If the Tx-Adjust is 0, the uplink coverage and the downlink coverage can be expressed as the same.

On the other hand, the wide code division multi-access (WCDMA) system, unlike the CDMA system, does not have a value called Tx-Adjust. Therefore, a problem of detecting a link balance can become an issue since a method of detecting the link balance has not been defined for detecting a state of the uplink in comparison with the downlink of the appropriate cell.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Certain embodiments of the present invention will be described below in detail with reference to the accompanying drawings. For better understanding overall in describing aspects of the present invention, the same reference numerals are used for the same means, regardless of the figure number. Those components that are the same or are in correspondence are rendered the same reference numeral regardless of the figure number, and redundant explanations are omitted.

FIG. 1 shows a link balance detecting device in accordance with an embodiment of the present invention.

As referring to FIG. 1, a link balance detecting device 100 comprises a link balance detection quotient default value setting part 110, a parameter calculating part 120, a link balance detecting part 130 and a link balance state information transmitting part 140. The link balance detecting device 100 can belong to a communications terminal 200. Here, the communication terminal 200 can be configured to communicate through mobile communication network, i.e. a WCDMA phone. The communication terminal 200 can also be a measuring device to measure the management of mobile communications services.

The link balance detection quotient default value setting part 110 is for setting a default value of a link balance detection quotient. Here, the default value of the link balance detection quotient can be a default set to detect a balance of a downlink and uplink coverage of an appropriate cell.

First of all, the link balance detection quotient default value setting part 110 can set a minimum Receiving Signal Code Power (RSCP) by using system information received from a base station 300 of the cell.

In the description, the minimum Receiving Signal Code Power (RSCP) can be referred to as a minimum value of Receiving Signal Code Power, at which a communication terminal 200 may not be able to receive radio waves from the base station 300. In other words, the minimum Receiving Signal Code Power (RSCP) can be referred to as a value of Receiving Signal Code Power, at which the communication terminal 200 is just out of a call coverage area of the base station 300. In one embodiment of the present invention, the minimum Receiving Signal Code Power can be variously set by the operator or the service provider. However, for better understanding in this description, the minimum Receiving Signal Code Power can be referred to as a value of Receiving Signal Code Power, at which the communication terminal 200 is just out of the call coverage area of the base station 300, hereinafter.

The minimum Receiving Signal Code Power, at which the communication terminal is out of the call coverage area, can be defined by a parameter set by the system. The system parameter defining the call coverage area can be, for example, #3 of system information block (SIB) in the WCDMA system.

The minimum Receiving Signal Code Power can be modified by changing the downlink coverage in accordance with an appropriate parameter, such as q-RxlevMin or deltaQrxlevmin, set by the service provider.

The link balance detection quotient default value setting part 110 calculates a maximum Tx power of the communication terminal 200 when the communication terminal 200 is out of the call coverage area.

As such, the maximum Tx power corresponding to the minimum Receiving Signal Code Power (RSCP) can be referred to as terminal Tx power that transmits radio waves from the communication terminal 200 to the base station 300. To calculate the terminal Tx power, an initial power setting equation (Mathematic equation 1) defined by an industry standard of 3 GPP can be used.

$$UE\_Tx\_Power = \text{Primary CPICH } DL\ Tx\ Power - \text{CPICH\_RSCP} + UL\ \text{interference} + \text{Constant Value} \quad \text{[Mathematic Equation 1]}$$

Here, Primary CPICH DL Tx Power is a value of Tx Power of Common Pilot Channel transmitted from the base station 300, CPICH_RSCP (Receiving Signal Code Power) is a value of receiving signal code of common pilot channel received from the terminal 200, UL interference is a value of uplink interference, and a Constant Value is a minimum signal level being below a noise signal needed for a subscriber terminal of the base station 300. Also, the Constant Value is a value needed for setting Tx output of the terminal 200 from the base station 200 being on the state of uplink for the link balance. Tx output of the terminal 200 is set to satisfy error rate (BLER) set after demodulating at the base station 300. The Constant Value can be defined in Mathematic Equation 2 as follows.

$$\begin{aligned}\text{Constant} &= \text{Processing Gain} - \\ &\quad \{\text{Required } Eb/No + \text{Margin}\} \\ &= \text{Processing Gain} - \\ &\quad \{\text{Required } UL\ SIR \times \text{Beta Ratio}\}\end{aligned} \quad \text{[Mathematic Equation 2]}$$

Processing Gain is a ratio of frequency band range to data transmission efficiency and can be calculated by Mathematic Equation 3 which follows.

$$\text{Processing Gain} = 20\ \log(W/R) \quad \text{[Mathematic Equation 3]}$$

Here, W is frequency bandwidth, R is data rate, Required Eb/No is energy per bit of a baseband signal needed for realizing the system and terminal 200, Margin is a margin against energy per bit of a baseband signal needed for realizing the system and terminal 200, Beta Ratio is a power comparison value of user's data and signaling data, and Up Required SIR is a level value of noise to signal in the wireless environments for satisfying Target BLER in Outer Loop Power Control.

Mathematic Equation 2 and Mathematic Equation 3 described above are all regulated in the standard of 3 GPP, and these are generally understood by those with ordinary knowledge in the field of art, so that detailed explanations are omitted.

In accordance with one embodiment of the present invention, suppose that the terminal Tx-power calculated from Mathematic Equation 1 is an ideal value taking into consideration of the constant value.

In case the current communication terminal 200 is out of the call coverage area at −119 dBm and the terminal Tx-power is at 24 dBm at the time, the default value of link balance detection quotient can be set at 0. The minimum Receiving Signal Code Power can be changed in accordance with the appropriate parameter set by the service provider, and the Tx-power for the maximum terminal 200 can be also changed in accordance with the parameter.

So, Table 1 can be framed as follows.

TABLE 1

| RSCP | UE TX |
|---|---|
| −119 | 24 |
| −118 | 23 |
| −117 | 22 |
| −116 | 21 |
| −115 | 20 |
| −114 | 19 |
| −113 | 18 |
| −112 | 17 |
| −111 | 16 |
| −110 | 15 |
| −109 | 14 |
| −108 | 13 |
| −107 | 12 |
| −106 | 11 |
| −105 | 10 |
| −104 | 9 |
| −103 | 8 |
| −102 | 7 |
| −101 | 6 |
| −100 | 5 |
| −99 | 4 |
| −98 | 3 |
| −97 | 2 |
| −96 | 1 |
| −95 | 0 |
| −94 | −1 |

TABLE 1-continued

| RSCP | UE TX |
|---|---|
| −93 | −2 |
| −92 | −3 |
| −91 | −4 |
| −90 | −5 |
| −89 | −6 |
| −88 | −7 |
| −87 | −8 |
| −86 | −9 |
| −85 | −10 |
| −84 | −11 |
| −83 | −12 |
| −82 | −13 |
| −81 | −14 |
| −80 | −15 |
| −79 | −16 |
| −78 | −17 |
| −77 | −18 |
| −76 | −19 |
| −75 | −20 |
| −74 | −21 |
| −73 | −22 |
| −72 | −23 |
| −71 | −24 |
| −70 | −25 |
| −69 | −26 |
| −68 | −27 |
| −67 | −28 |
| −66 | −29 |
| −65 | −30 |
| −64 | −31 |
| −63 | −32 |
| −62 | −33 |
| −61 | −34 |
| −60 | −35 |
| −59 | −36 |
| −58 | −37 |
| −57 | −38 |
| −56 | −39 |
| −55 | −40 |
| −54 | −41 |
| −53 | −42 |
| −52 | −43 |
| −51 | −44 |
| −50 | −45 |
| −49 | −46 |
| −48 | −47 |
| −47 | −48 |
| −46 | −49 |
| −45 | −50 |
| −44 | −51 |
| −43 | −52 |
| −42 | −53 |
| −41 | −54 |
| −40 | −55 |

For instance, suppose that Receiving Signal Code Power, at which the terminal is out of call coverage, is at −115 dBm. Here, a mobile communications system operator can have an additional system setting by decreasing −1 dB from −115 dBm at a time, while the terminal Tx-power is mapped at 24.

The link balance detection quotient default value setting part 110 can set a default value of link balance detection quotient by calculating the minimum Receiving Signal Code Power (RSCP) and the maximum Tx power.

Here, the default value of link balance detection quotient is a default value for detecting whether the uplink and downlink coverage of the appropriate cell has a defect. The link balance detection quotient default value setting part 110, for example, can calculate a sum by adding up the minimum Receiving Signal Code Power (RSCP) and the maximum Tx power and then compare the calculated sum and the default value of the link balance detection quotient.

$$SUM = RSCP + UE\ Tx\ Power \qquad \text{[Mathematic Equation 4]}$$

TABLE 2

| SUM | link balance detection quotient |
|---|---|
| — | — |
| — | — |
| −100 | −5 |
| −99 | −4 |
| −98 | −3 |
| −97 | −2 |
| −96 | −1 |
| −95 | 0 |
| −94 | +1 |
| −93 | +2 |
| −92 | +3 |
| −91 | +4 |
| −90 | +5 |
| — | — |
| — | — |

Here, the default value of link balance detection quotient can be 0 of the link balance detection quotient corresponding to the sum −95 of an appropriate line as shown in Table 2. The link balance detection quotient default value setting part 110, for example, can set the default value of the link balance detection quotient through Mathematic Equation 5 as follows.

$$\begin{aligned}A\ default\ value\ of\ link\ &\text{[Mathematic Equation 5]}\\ balance\ detection\ quotient = &\\ Offset + UE\ Tx\ Power + -RSCP = &\\ -[\{(q\_rxlevMin \times 2) + 1 - delta\ q\_rxlevMin\} + &\\ UE\_Maximum\ PWR] + &\\ UE\ Tx\ Power + RSCP&\end{aligned}$$

Here, Offset refers to as a constant for calculating the default value of the link balance detection quotient corresponding to the sum of the maximum terminal Tx power and the minimum Receiving Signal Code Power (RSCP). In the table mentioned above, the Offset may be +95. The Offset can be varied in the wide code division multi-access (WCDMA) system, unlike the code division multi-access system (CDMA) where the Offset for detecting the link balance is fixed at 76.

Here, q_rxlevMin, delta q_rxlevMin, and UE_Maximum PWR are parameters set for a communication terminal. The q_rxlevMin is a value at a point of time when a cell selection is possible, which is a minimum terminal receiving power for ensuring the quality of a signal received from the base station. The delta q_rxlevMin is one of the Offset values as an extension value of q_rxlevMin.

A parameter calculating part 120 is for measuring the Receiving Signal Code Power (RSCP) and the terminal Tx-power corresponding to the RSCP in the communication terminal 200. A link balance detection part 130 compares a default value of the link balance detection quotient with a value calculated in accordance with the measured Receiving Signal Code Power (RSCP) and terminal Tx-power corresponding to the RSCP from a parameter calculating part 120. The link balance detection part 130 also detects the balance of the downlink and uplink coverage from a cell to which the communication terminal 200 belongs.

The link balance detection part 130 first finds a sum of the Receiving Signal Code Power (RSCP) and the terminal Tx-power in accordance with the RSCP measured from the parameter calculating part 120 in Table 2 and then detects the link balance detection quotient in accordance with the appropriate sum.

In case the link balance detection quotient is positive (+), the link balance detection part 130 can detect that the uplink coverage is relatively smaller than the downlink coverage. Conversely, in case the link balance detection quotient is negative (−), the downlink coverage is relatively bigger than the uplink coverage.

A link balance state information sending part 190 provides the verified link balance detection quotient to a system operating device (not illustrated).

As described above, when the link balance detection quotient is verified, the mobile communications system operator can detect whether the uplink and downlink coverage has a defect. Then, the operator can perform the repeater's gain re-setting and the inspecting of the downlink and uplink coverage afterwards. Also, it can be applied to a wireless measuring device, the communication terminal 200 and a debug screen. FIG. 2 shows a method of detecting a link balance in accordance with an embodiment of the present invention.

As depicted in FIG. 2, in the step of S210, a link balance detecting device 100 sets a minimum Receiving Signal Code Power (RSCP) of a terminal 200 by using system information received from a base station 300. Here, being out of the call coverage area means that the communication terminal 200 is not capable of receiving radio waves from the base station 300. In the step of S220, the link balance detecting device 100 sets the maximum terminal Tx power at which radio waves are transmitted from the terminal 200 to the base station 300 in accordance with the fixed minimum Receiving Signal Code Power.

In the step of S230, the link balance detecting device 100 sets a default value of link balance detection quotient by calculating the minimum Receiving Signal Code Power (RSCP) and the maximum terminal Tx power. Here, the link balance detection quotient is used for detecting whether the uplink and downlink coverage has a defect.

For example, the link balance detecting device 100 can set the default value of a link balance detection quotient by adding up the selected minimum Receiving Signal Code Power (RSCP) and the maximum terminal Tx power.

In the step of S240, the link balance detecting device 100 measures the Receiving Signal Code Power (RSCP) and the terminal Tx power from the terminal 200.

In the step of S250, the link balance detecting device 100 calculates the measured Receiving Signal Code Power (RSCP) and the measured terminal Tx power in the same way as the calculation described above. Then, the link balance detecting device 100 detects the balance of the downlink and uplink coverage by comparing the calculated value with the fixed default value of the link balance detection quotient.

The link balance detecting device 100 can detect the balance of the downlink and uplink coverage of a cell to which the communication terminal 200 belongs to by comparing the fixed default value of the link balance detection quotient with a value calculated in accordance with the measured Receiving Signal Code Power (RSCP) and terminal Tx power.

In the step of S260, the link balance detecting device 100 transmits information of link balance state for the balance of the downlink and uplink coverage to an operating device of the mobile communications system.

The operating device of the mobile communications system can detect whether the uplink and downlink coverage has a defect by using the received link balance state information and can check the path loss and a base station's degradation or a repeater's subscriber terminal. Therefore, in accordance with one embodiment of the present invention, it is simple to operate the operating device. FIG. 3 shows a link balance detection quotient and explains the state of network by using system information messages in accordance with an embodiment of the present invention.

The operating device of the mobile communications system can receive information of link balance state from the link balance detecting device 100. The link balance detection quotient is ideal as 0. Accordingly, the link balance detection quotient can be classified into two cases where one is greater than 0, and the other is smaller than 0. A state of network can be predicted in accordance with each case as illustrated in FIG. 3.

As depicted in FIG. 3, in case the link balance detection quotient is greater than 0, the base station 300 needs the checking of the up path's degradation. Also, in case the link balance detection quotient is smaller than 0, a repeater needs the checking of the up path's degradation and the checking of down over setting of the repeater.

When the link balance detection quotient is greater than 0, the measured communication terminal Tx power becomes greater than the normal Tx power. Thus, in case of the up path, in which the base station's subscriber terminal becomes degraded, the communication terminal 200 continues to transmit high power.

Here, if the link balance detection quotient is over a prefixed default value of +10 dB that is pre-determined while operating the base station 300 or a repeater, the base station 300 or the repeater can be in out of order. This means that there is no communication at Cell Edge.

When the link balance detection quotient is smaller than 0, the checking of a down path's degradation is required in the base station 300 for the link balance. When the link balance detection quotient is smaller than 0, the checking of the repeater's up over setting is required because the checking of the down path is necessary in the repeater.

When the link quotient is smaller than 0, the measured terminal 200 Tx power becomes relatively smaller than the normal Tx power. That is, in case of down, the base station's subscriber terminal becomes degraded, and the communication terminal 200 receives relatively high signals.

Here, when the link balance detection quotient is over a prefixed default value of −10 dB while operating the base station 300 or a repeater, the measured base station 300 or the repeater can be in out of order.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A method of detecting a link balance of coverage of a down link and an up link in a mobile communication system, the method comprising:
   setting a minimum receiving signal code power based on system information received from a base station;
   setting a maximum terminal Tx power for transmitting radio wave to the base station from a communication terminal in accordance with the minimum receiving signal code power;
   setting a reference value of a link balance detection quotient for detecting whether the up link and down link coverage has a defect based on calculation of the minimum receiving signal code power and the maximum terminal Tx power;

measuring a receiving signal code power and a terminal Tx power of the communication terminal;

detecting the balance of the down link and up link coverage based on comparison of the reference value of the link balance detection quotient with a value calculated in accordance with the measured receiving signal code power and terminal Tx power; and transmitting information of link balance state for the balance of the down link and up link coverage to an operating device of the mobile communications system.

2. The method of claim 1, wherein the method is performed by a link balance detecting device.

3. The method of claim 1, wherein the reference value of the link balance detection quotient is set by combining the minimum receiving signal code power and the maximum terminal Tx power.

4. The method of claim 1, wherein the up link coverage is determined to be greater than the down link coverage if the calculated value is greater than the reference value of the link balance detection quotient, and wherein the up link coverage is determined to be smaller than the down link coverage if the calculated value is smaller than the reference value of link balance detection quotient.

5. A device for detecting a balance of a down link and up link coverage in a mobile communications system, the device comprising:

a reference value setting portion configured to set a reference value of a link balance detection quotient for detecting whether the up link and down link coverage has a defect based on a minimum receiving signal code power and a maximum terminal Tx power of a communication terminal with the use of system information received from a base station, wherein the maximum terminal Tx power is a terminal Tx power, in which radio wave is transmitted from the communication terminal to the base station, in accordance with the minimum receiving signal code power;

a parameter calculator configured to calculate a receiving signal code power and a terminal Tx power associated with the communication terminal;

a link balance detector configured to detect the balance of the down link and up link coverage from a cell to which the communication terminal belongs, based on comparison of the reference value of the link balance detection quotient with a calculated value of the receiving signal code power and the terminal Tx power; and a link balance state information transmitter configured to transmit information of link balance state for the balance of the down link and up link coverage from the cell to which the communication terminal belongs to an operating device of the mobile communication system.

6. A device for detecting a link balance of coverage of a down link and an up link in a mobile communication system, the device comprising:

means for setting a minimum receiving signal code power based on system information received from a base station;

means for setting a maximum terminal Tx power for transmitting radio wave to the base station from a communication terminal in accordance with the minimum receiving signal code power;

means for setting a reference value of a link balance detection quotient for detecting whether the up link and down link coverage has a defect based on calculation of the minimum receiving signal code power and the maximum terminal Tx power;

means for measuring a receiving signal code power and a terminal Tx power of the communication terminal;

means for detecting the balance of the down link and up link coverage based on comparison of the reference value of the link balance detection quotient with a value calculated in accordance with the measured receiving signal code power and terminal Tx power; and means for transmitting information of link balance state for the balance of the down link and up link coverage to an operating device of the mobile communications system.

* * * * *